F. M. MINER
Oct. 9, 1928. GAS HEATER Re. 17,098
Original Filed Oct. 30, 1924
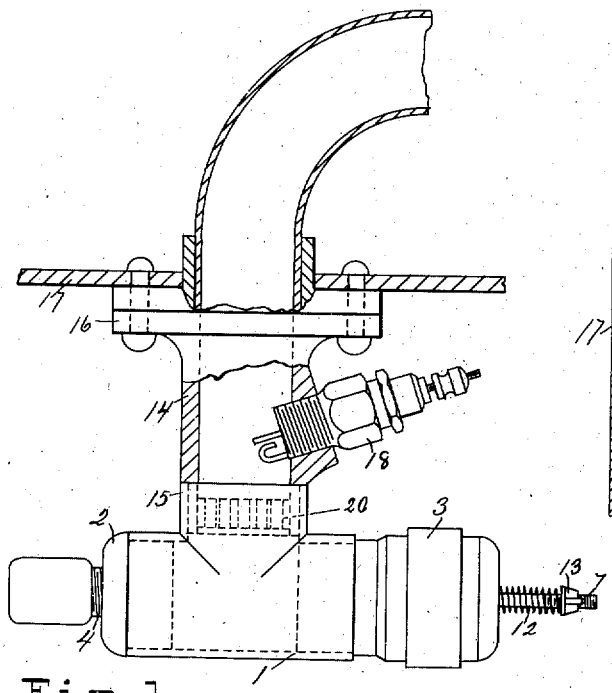
Fig. 1.
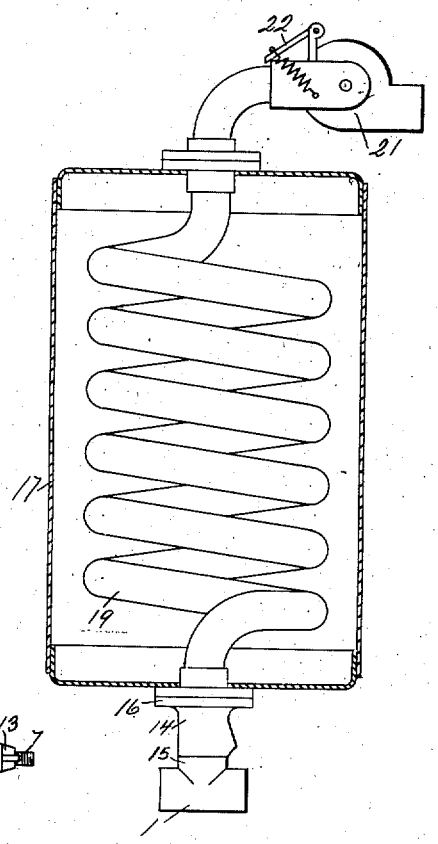
Fig. 5.
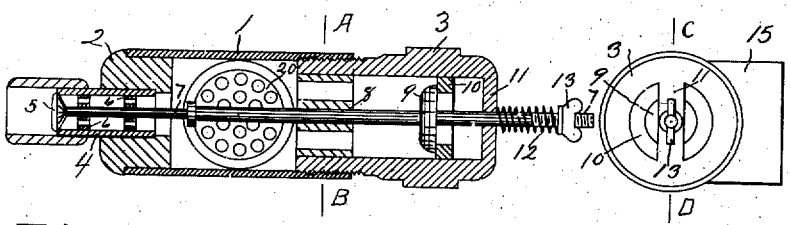
Fig. 2.
Fig. 3.
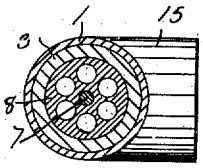
Fig. 4.
INVENTOR.
FREDERICK. M. MINER.
BY Charles Albert Fruech.
ATTORNEY.

Reissued Oct. 9, 1928. Re. 17,098

UNITED STATES PATENT OFFICE.

FREDERICK M. MINER, JR., OF MADISON, WISCONSIN.

GAS HEATER.

Original No. 1,568,610, dated January 5, 1926, Serial No. 746,879, filed October 30, 1924. Application for reissue filed March 8, 1927. Serial No. 175,392.

My invention relates to heating water in steam boilers and the like by means of a coiled pipe, through which a continuous stream of fire from combustible gas is drawn by a strong suction; and the objects of my invention are, first, to construct a burner and carburetor adapted to be located just outside of a boiler and connected to a coil of pipe which passes into and through the boiler and is connected to an exhaust fan or means causing a strong suction; second, to provide a member for ignifying gas mixed with air by the carburetor, whether the gas is natural, fuel, or the product of volatile liquids; third, to provide a safety valve between the coil and exhaust fan to eliminate danger from an explosion in the coil, in case the combustible mixture should be drawn into the coil before the ignifying member is in operation.

I attain these objects by the mechanism shown in the accompanying drawing in which—

Fig. 1, is a plan when attached to a horizontal boiler partly in section;

Fig. 2, is a vertical longitudinal section on line C—D of Fig. 3;

Fig. 3, is a right end elevation;

Fig. 4, is a transverse section on line A—B Fig. 2;

Fig. 5, is a horizontal section through a horizontal boiler with device installed, on reduced scale.

Similar numerals refer to similar parts throughout the several views.

The body 1 is a cylindrical T with a head 2 secured into the left end, and a sleeve 3 secured into the right end, a nipple 4 is threaded centrally into the head 2 with a seat formed on the outer end for a valve 5. Perforated bridges 6 are located in the nipple permitting gas to pass through the nipple, and they also provide a bearing for a valve stem 7, said valve stem passes centrally and longitudinally through the bridges 6 and through a larger perforated bridge 8 to a larger valve 9 which seats against an annular wall 10 in the sleeve 3. An extension of the valve stem 7 passes from the valve 9 outward beyond the end of the sleeve and is slidably disposed through a bar 11 across the outer end thereof, a compression spring 12 is located on the extension abutting the bar on its outer surface, and is compressible by a wing nut 13 threaded to the outer end of the extension. A flanged cylindrical member 14 is threaded to the branch 15, and by a flange 16 is secured to a boiler 17. An ignifying member 18 is located through 14 and electrically connected to a battery or within an electric circuit. The operation of this device is as follows. The coil is located within a casing or boiler, gas is conveyed to the valve 5 which is by stem 7 connected to a much larger valve 9 and both are held to their seats by the spring 12, and as the valve 9 is open to the atmosphere a vacuum formed within the coil 19 will overcome the resistance of the spring 12 and open both valves, gas will flow through valve 5 and air through the valve 9, the two uniting will flow upward through the perforated bridge 20 at the bottom of member 14, and be ignited by the member 18 and pass through the coil 19 as a live flame, and the heat be transmitted through the metal of the coil to the water within the boiler. An exhaust fan 21 is provided for sufficient draft, and a safety valve 22 is installed between the coil and fan, to take care of explosions.

Having thus described my invention, I claim:

1. In a device of the kind described, a boiler, a coil of pipe disposed therein, a pipe fitting in the form of a T, a head at one end of the top of the T, a sleeve at the opposite end of said top, a valve stem slidably mounted centrally within the top of the T by means of perforated bridges in the head and sleeve, valves at both ends of the stem opening in the same direction, one end being adapted for connection with a source of combustible fluid, and the other end communicating with the atmosphere, a tubular member secured to the stem of the T, a perforated bridge adjacent one end of said member and means at the opposite end connecting it to said coil of pipe, an exhaust fan connected to the other end of the coil, a safety valve interposed between the coil and fan, and means for igniting a combustible mixture supplied through said T before it enters the coil.

2. A boiler or water heater comprising, in combination, a tank, a fire-tube heating coil within the tank, a carburetor connected to deliver a fuel mixture to one end of the coil, said carburetor having a fuel control valve and an air control valve, means to ignite the fuel mixture as it is delivered to the coil, means to create a draft through the coil whereby the flame is propagated substantially throughout the length of the coil, said valves being operable by the draft means.

3. In a boiler or water heater, a tank, a fire-tube extending therethrough, a carburetor connected to one end of said tube, control means for the carburetor, an igniter adjacent to the carburetor, and a suction device also connected to said tube to propagate a flame substantially throughout the length thereof, said control means being operable by the suction means.

4. In a boiler or water heater, a tank, a fire-tube heating coil passing therethrough, means to supply an ignitable fuel mixture to one end of the coil, said means including a T shaped casing having inlets at its opposite ends for fuel and air and an outlet intermediate its ends for the mixture of fuel and air, valves in the casing to control the inlet of fuel and air, a tubular member connecting the outlet to the coil, an electric igniter in the tubular member for the fuel mixture, a suction fan connected to the other end of the coil, and a safety valve between said coil and said fan.

In testimony, that I claim the foregoing as my own, I have hereto affixed my signature.

F. M. MINER, Jr.